US012699055B2

(12) United States Patent
Balducci et al.

(10) Patent No.: US 12,699,055 B2
(45) Date of Patent: Aug. 4, 2026

(54) METHOD AND DEVICE FOR INSPECTING AN INCISION ON A PLASTIC CAP

(71) Applicant: SACMI COOPERATIVA MECCANICI IMOLA SOCIETA' COOPERATIVA, Imola (IT)

(72) Inventors: Massimo Balducci, Imola (IT); Donato Laico, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 486 days.

(21) Appl. No.: 17/999,642

(22) PCT Filed: May 21, 2021

(86) PCT No.: PCT/IB2021/054431
§ 371 (c)(1),
(2) Date: Nov. 22, 2022

(87) PCT Pub. No.: WO2021/240324
PCT Pub. Date: Dec. 2, 2021

(65) Prior Publication Data
US 2023/0204518 A1     Jun. 29, 2023

(30) Foreign Application Priority Data

May 25, 2020     (IT) ........................ 102020000012214

(51) Int. Cl.
*G01N 21/88*        (2006.01)
*G06T 7/00*         (2017.01)
*G01N 21/84*        (2006.01)

(52) U.S. Cl.
CPC ..... *G01N 21/8851* (2013.01); *G01N 21/8806* (2013.01); *G06T 7/0004* (2013.01);
(Continued)

(58) Field of Classification Search
CPC ..... G01N 2021/845; G01N 2021/8848; G01N 21/8806; G01N 21/8851; G01N 21/909; G06T 7/0004
See application file for complete search history.

(56) References Cited

U.S. PATENT DOCUMENTS

2009/0278925 A1     11/2009   Koval et al.

FOREIGN PATENT DOCUMENTS

DE      102005061087 A1 *   7/2007   ......... G01N 21/9036
JP      H05-164706 A        6/1993
(Continued)

OTHER PUBLICATIONS

International Search Report and Written Opinion for corresponding International Application No. PCT/IB2021/054431 mailed Jul. 22, 2021.

*Primary Examiner* — Tri T Ton
(74) *Attorney, Agent, or Firm* — CHRISMAN GALLO TOCHTROP

(57)                ABSTRACT

A method for inspecting an incision made on a lateral surface of a plastic cap includes the following steps: conveying the plastic cap along an inspection path through an inspection zone in which the cap is inspected; emitting a polarized light collimated along a light orientation towards the inspection zone; capturing image data representing at least one image of the lateral surface of the cap through an optical sensor; receiving the image data in a control unit; processing the image data to derive information about the incision.

23 Claims, 9 Drawing Sheets

(52) U.S. Cl.
CPC .................. *G01N 2021/845* (2013.01); *G01N 2021/8848* (2013.01)

(56) References Cited

FOREIGN PATENT DOCUMENTS

| JP | H06-100085 | A | | 4/1994 |
|----|-----------|-----|---|--------|
| JP | H06100085 | B2 | * | 4/1994 |
| JP | H09169392 | A | * | 6/1997 |
| JP | 4815637 | B2 | * | 11/2011 |
| JP | 2017-120201 | A | | 7/2017 |

* cited by examiner

METHOD AND DEVICE FOR INSPECTING AN INCISION ON A PLASTIC CAP

CROSS-REFERENCE TO RELATED APPLICATIONS

This is a National Stage application of PCT international application PCT/IB2021/054431 filed on May 21, 2021, which claims the priority of Italian Patent Application No. 102020000012214, filed May 25, 2020, which are incorporated herein by reference in their entireties.

TECHNICAL FIELD

This invention relates to a method and a device for inspecting an incision made on a lateral surface of a plastic cap.

BACKGROUND ART

In the sector involved in the manufacture of plastic caps, it is common practice to make caps provided with a security ring obtained by making an incision in the main body of the cap, leaving intact only some parts of it which define frangible connecting means. The security ring remains attached to the main body of the cap until the container the cap is placed on is used for the first time. When used for the first time, the user applies a force that breaks the frangible connecting means and releases the security ring from the main body to allow the container to be opened.

In other types of cap, known in the trade as "tethered", the cap comprises at least one permanent connector in addition to the frangible connecting means. The permanent connector connects the bottom part of the cap (the security ring or tamper evident ring), which remains attached to the neck of the container, to the top part of the cap, which can be lifted to allow the liquid to be poured out of the container the cap is placed on. The top part thus remains attached to the bottom part. Usually, the permanent connector allows relative rotation between the bottom part and the top part of the cap.

In both of these types of cap, the security ring and the bottom part of the tethered cap are made by making an incision in the cap. Thus, a poor quality incision might, on the one hand, make it difficult for the user to open the container and, on the other, lead to unwanted breaking prior to use, making the product unsellable.

There is therefore an ever-growing need to accurately inspect the incisions before the caps are applied on the respective containers.

In the reference sector, all prior art solutions for inspecting the lateral surface of these caps lack precision and accuracy. In particular, the prior art solutions do not allow determining the quality state of an incision, the presence of connectors and their thickness.

Examples of methods to inspect an incision and of devices to inspect an incision are disclosed in the following documents: JPH06100085A, JPH09169392A1, JP2017120201A, JP4815637A, US2009278925A1 and JPH05164706A.

DISCLOSURE OF THE INVENTION

The aim of this invention is to provide a method for inspecting an incision and a device for inspecting an incision to overcome the above mentioned disadvantages of the prior art.

This aim is fully achieved by the method and device for inspecting an incision according to this disclosure as characterized in the appended claims.

According to an aspect of it, this disclosure provides a method for inspecting an incision made on a lateral surface of a plastic cap.

In an embodiment, the method comprises a step of conveying the cap on a conveyor. The plastic cap is conveyed along an inspection path passing through an inspection zone in which the cap is placed for inspection.

The method comprises a step of emitting a light (a light beam). The light is preferably polarized. The light is preferably collimated along a light orientation towards the inspection zone. The step of emitting is carried out by an illuminator. In the step of emitting, the lateral surface of the cap is illuminated.

The polarization and the collimation of the light each has a specific technical effect. Said technical effects may be combined or exploited alone.

The use of collimated light allows particular advantages in the preferred embodiments, wherein the cap is illuminated frontally (from the outside, laterally). In fact, the collimated light allows to increase the light vs dark difference between the colour detected for the incision (dark part) and the colour detected for the other parts (bright part), because the incision keeps a darker colour and, hence, is possible to identify better the presence of the incision. In fact, in this example, the illuminator is externa to the cap and reflected rays are detected (a reflection approach to the detection is used, rather than a transmission approach). Conversely, in the embodiments with internal illumination of the cap (or illumination from the top), this aspect is not so relevant.

In some embodiments, the illuminator may include a lightning cylinder (or, more in general, a collimator having a curved surface, with concavity facing the object to be inspected) with collimated light, which invests a collimated light over the whole (or an stretch corresponding to at least 150 degrees) cylindrical surface of the cap.

In one embodiment, the illuminator includes a filtering grid, configured to block the light ray having a certain inclination.

The use of the polarized light allows to obtain reliable results even in case of high reflective and lucid surface of the cap (this depends on the material of the cap) and with frontal illumination.

The method comprises a step of capturing image data representing at least one image of the lateral surface of the cap.

The step of capturing is carried out by an optical sensor. The method comprises a step of receiving the image data in a control unit.

The method comprises a step of processing the image data to derive information about the incision based on the image data.

In an embodiment, in the step of capturing, the image data represent a plurality of images of the lateral surface of the cap. Each of the plurality of images corresponds to a respective portion of the lateral surface of the cap. The portions of the lateral surface are spaced from each other along the lateral surface.

In an embodiment, the method comprises a step of planar development. In the step of planar development, the control unit processes the image data to derive a planarly developed image. The planarly developed image represents the lateral surface of the cap in a plane.

This allows better assessing the quality of the incision along the entire circumference and lateral surface of the cap.

In an embodiment, the method comprises a step of holding by suction. In the step of holding by suction, the cap being conveyed along the inspection path is held down on the conveyor by suction.

That way, the lateral surface of the cap moving along on the conveyor can remain uncovered and open to inspection by the optical sensor.

In an embodiment, the method comprises a step of rotating. In the step of rotating, the cap is rotated about an axis of rotation which is preferably perpendicular to the inspection path, so the cap rotates about its axis of symmetry. The step of rotating allows exposing the different portions of the lateral surface of the cap to the optical sensor to allow the latter to capture an image of each portion.

In one embodiment, the method provides a position verification step. In the position verification step, the control unit determines a first position, defined by the angular position of a portion of the cap where the incision is interrupted. In the position verification step, the control unit determines a second position, defined by an angular position of either or both of:

a reference element of the cap, for example designed to engrave on a cover of the bottle neck on which the cap is placed;

the beginning of a cap thread.

In one example, the control unit is programmed to verify that the first position is angularly spaced from the second position by a predetermined value.

In an embodiment, the plastic cap comprises a first portion and a second portion, connected to the first portion by a first, temporary connector which is removable to open the cap and by a second, permanent connector which allows relative movement between the first and the second portion of the cap. In other words, the method is a method for inspecting an incision on a "tethered" cap.

In an embodiment, the method comprises an additional step of imaging to form a plurality of steps of imaging, each intended to capture a corresponding subset of image data, each representing one or more images of a corresponding portion of the lateral surface of the cap. The plurality of steps of imaging are performed by a corresponding plurality of optical sensors which are angularly spaced from each other to image a respective portion of the lateral surface of the cap.

In other words, the image of the entire lateral surface of the cap may be captured by a single optical sensor combined with the rotation of the plastic cap or by mounting a plurality of angularly spaced optical sensors, each of which captures an image of a corresponding portion of the cap.

In an embodiment, the light orientation is parallel to an imaging orientation, along which the camera is pointed. In an embodiment, the cap is illuminated frontally and uniformly.

According to an aspect of it, this disclosure provides a device for inspecting an incision made on a lateral surface of a plastic cap.

The device comprises an inspection zone in which the cap to be inspected can be positioned. The device comprises a conveyor, configured to convey the cap along an inspection path passing through the inspection zone.

The device comprises an illuminator, configured to emit a light, which is preferably polarized and/or collimated along a light orientation. The illuminator is configured to emit a light directed at the inspection zone to illuminate the lateral surface of the cap.

The device comprises an optical sensor. The optical sensor is configured to capture image data representing at least one image of the lateral surface of the cap. The device comprises a control unit. The control unit is configured to receive the image data. The control unit is configured to process the image data to derive information about the incision from the image data.

In an embodiment, the image data represent a plurality of images of the lateral surface of the cap. Each of the images corresponds to a respective portion of the lateral surface of the cap. The portions of the lateral surface are spaced from each other along the lateral surface.

In an embodiment, the control unit is configured to process the image data to derive a developed image which preferably represents the lateral surface of the cap in a plane.

In an embodiment, the conveyor comprises a hold element. The hold element is configured to keep the cap in an inspection position as it moves along the inspection path.

In an embodiment, the hold element comprises a suction unit. The suction unit is configured to apply a negative pressure to hold the cap in place while it is being transported along the inspection path.

In an embodiment, the hold element rotates about an axis of rotation which is preferably perpendicular to the inspection path to rotate the cap about its axis of symmetry.

In an embodiment, the hold element comprises a plurality of notches, preferably spaced from each other along an outer circumference of the hold element. The notches allow subsequently reconstructing the planar development, making it easier to combine the plurality of images captured.

In an embodiment, the device comprises an additional optical sensor to form a plurality of optical sensors. The optical devices of the plurality are disposed at respective imaging positions, spaced from each other, to capture corresponding subsets of the image data. Each subset of the image data represents one or more images of a corresponding portion of the lateral surface of the cap.

In an embodiment, the inspection path defines a circular arc.

In an embodiment, the control unit is configured to filter the image data to keep only the image data representing a predetermined portion of the image of the lateral surface.

It is also noted that, precisely because the cap is illuminated laterally (form outside the cap), the illuminator is interposed between the cap and the optical sensor, along a detection direction of the optical sensor. In this regard, it is therefore important to provide solutions that limit the disturbance due to the presence of the illuminator when detected by the optical sensor.

Therefore, the device comprises a reflective element. In an embodiment, the illuminator is configured to emit the polarized light along an emission orientation. The emission orientation is inclined to the light orientation.

In an embodiment, the reflective element is configured to deflect the collimated polarized light from the emission orientation to the light orientation.

The reflection element is interposed between the cap and the optical sensor, along a detection direction of the optical sensor.

The reflection element includes a reflecting mirror, inclined so as to deflect the light from the direction of emission to the direction of illumination. Preferably, the reflective mirror is a semi-reflective mirror on both surfaces. The reflecting mirror divides the reflection element into a first chamber, facing the optical sensor, and a second chamber, facing the cap. The first chamber includes dark (i.e. black) walls, configured to minimize light reflection. The second chamber includes clear (i.e. white) walls, so as to convey all the light that is conveyed there towards the cap. This minimizes the back light returning to the optical sensor.

The filtering grid is interposed between the illuminator and the reflecting mirror, to allow the passage of light rays having an inclination angle of less than 35°, preferably 15°.

According to an aspect of it, this disclosure provides a machine for testing a detachment force between a first portion of a cap and a second portion of a cap, connected to the first portion of the cap by one or more connections. The detachment force is preferably a breaking strength of the one or more connections.

The machine comprises a hold element, configured to hold the first portion of the cap in place.

The machine comprises a second actuator, movable relative to the first actuator along a test orientation. The second actuator is configured to apply a force on the second portion of the cap along the test orientation, in a test direction.

The machine comprises an inspecting device according to one or more of the aspects described in this disclosure with reference to the device for inspecting an incision.

In an embodiment, the inspecting device is configured to generate positioning data in response to the image data. The positioning data represent a deviation, preferably angular, between an infeed position, adopted by the cap when it is fed to the machine, and a predetermined test position.

The machine comprises a positioning actuator, configured to rotate the cap from the infeed position to the predetermined test position, based on the positioning data.

BRIEF DESCRIPTION OF DRAWINGS

These and other features will become more apparent from the following description of a preferred embodiment, illustrated by way of non-limiting example in the accompanying drawings, in which.

DETAILED DESCRIPTION OF PREFERRED EMBODIMENTS OF THE INVENTION

Figure 1:
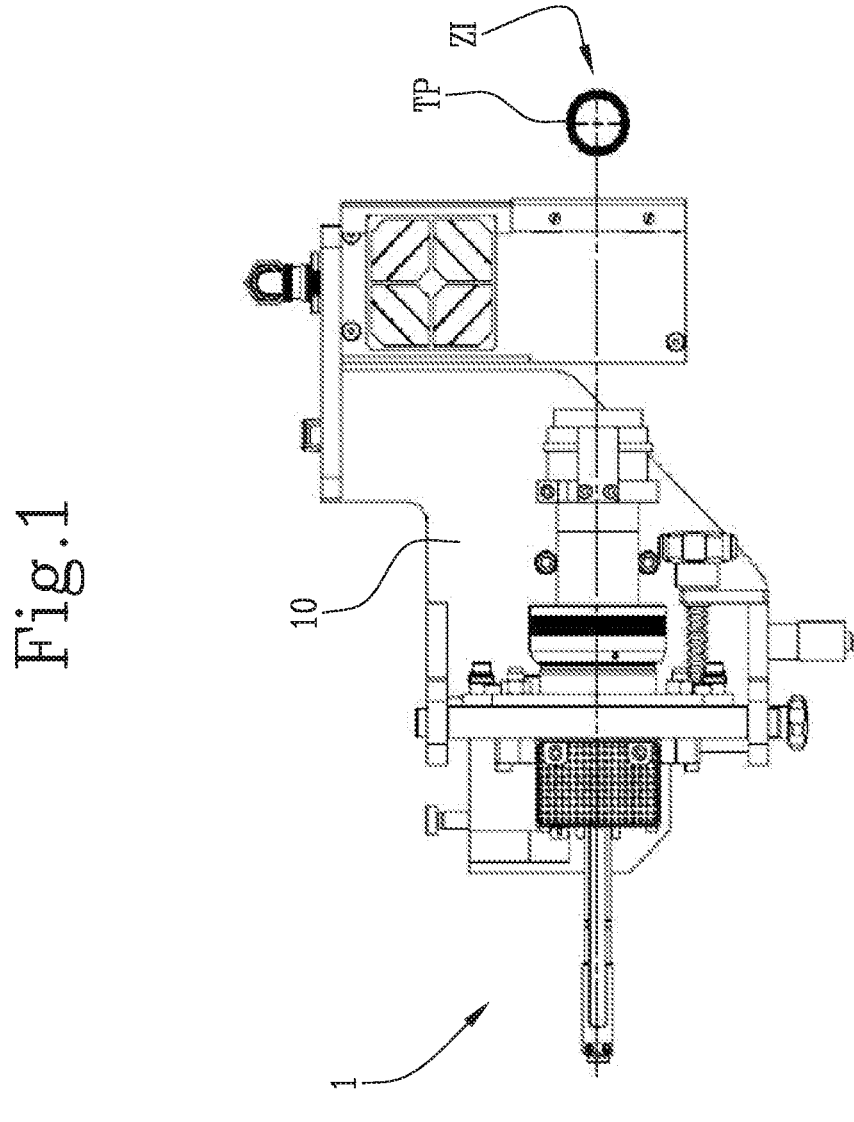
FIG. 1 shows a plan view of a device for inspecting an incision made on a lateral surface of a plastic cap.
Figure 2:
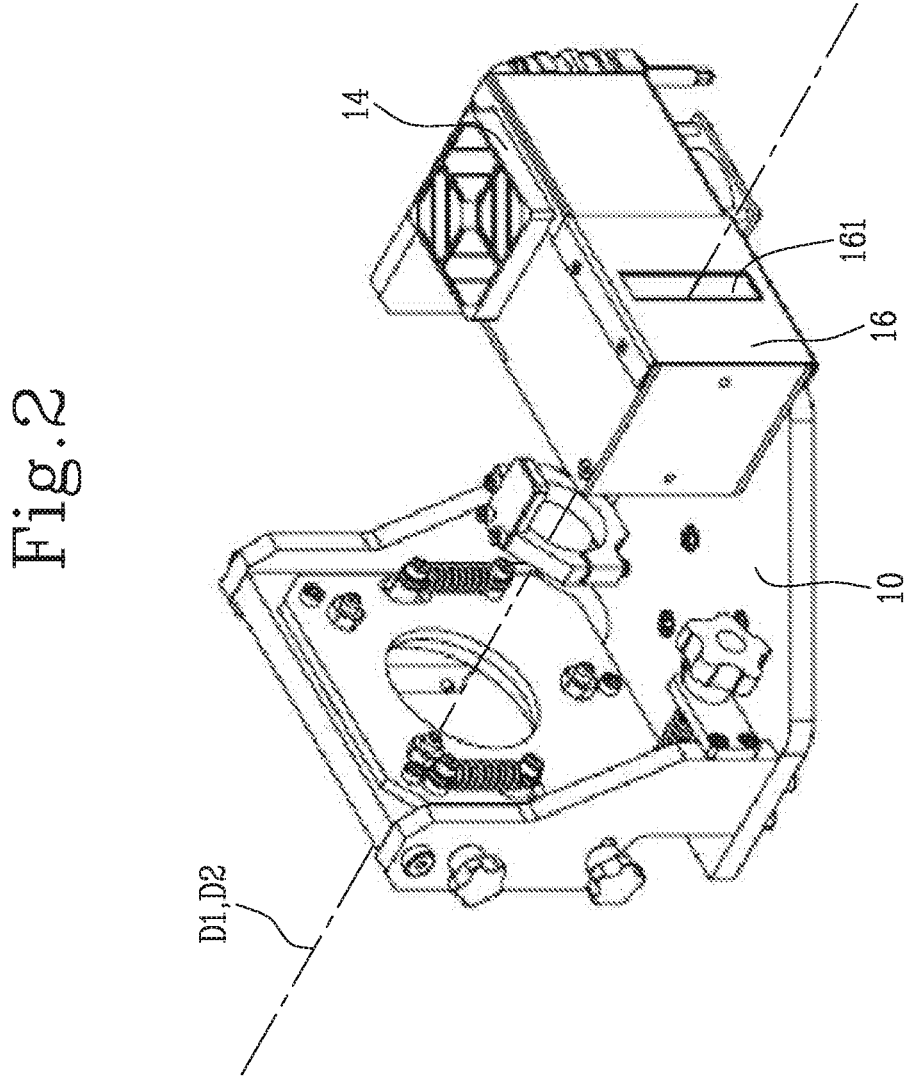
FIG. 2 shows a perspective view of the device of FIG. 1.
Figure 3:
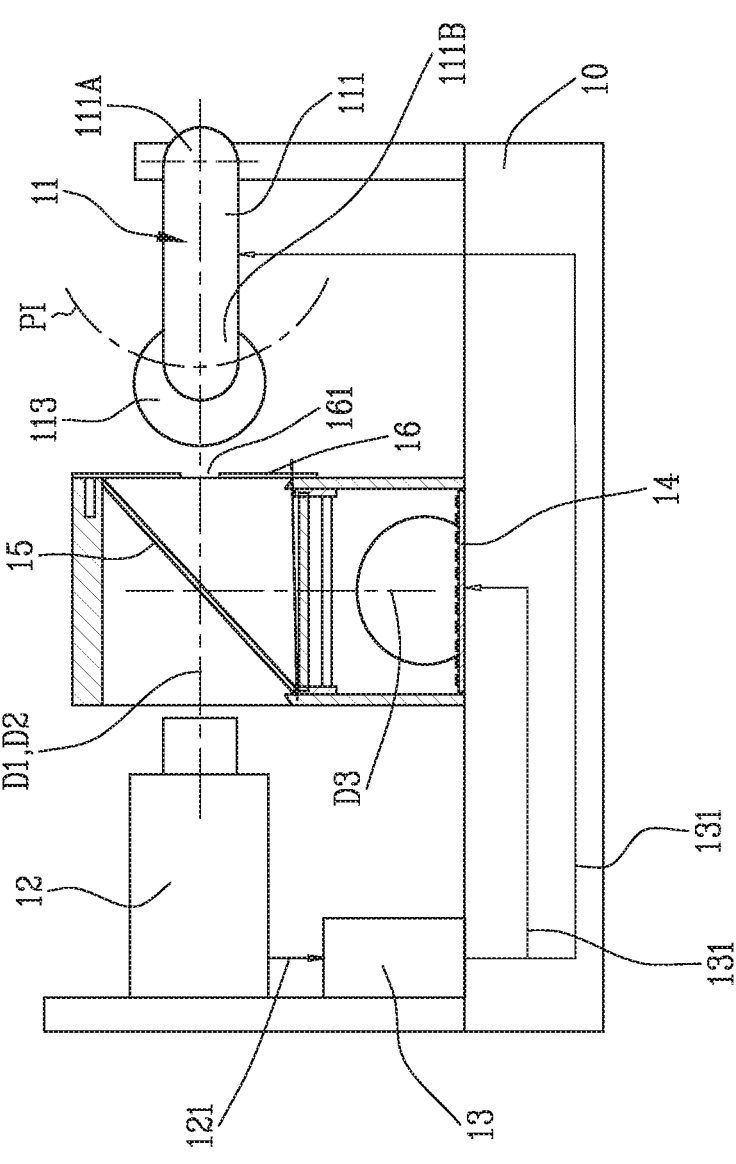
FIG. 3 is a schematic side view of the device of FIG. 1.
Figure 4:
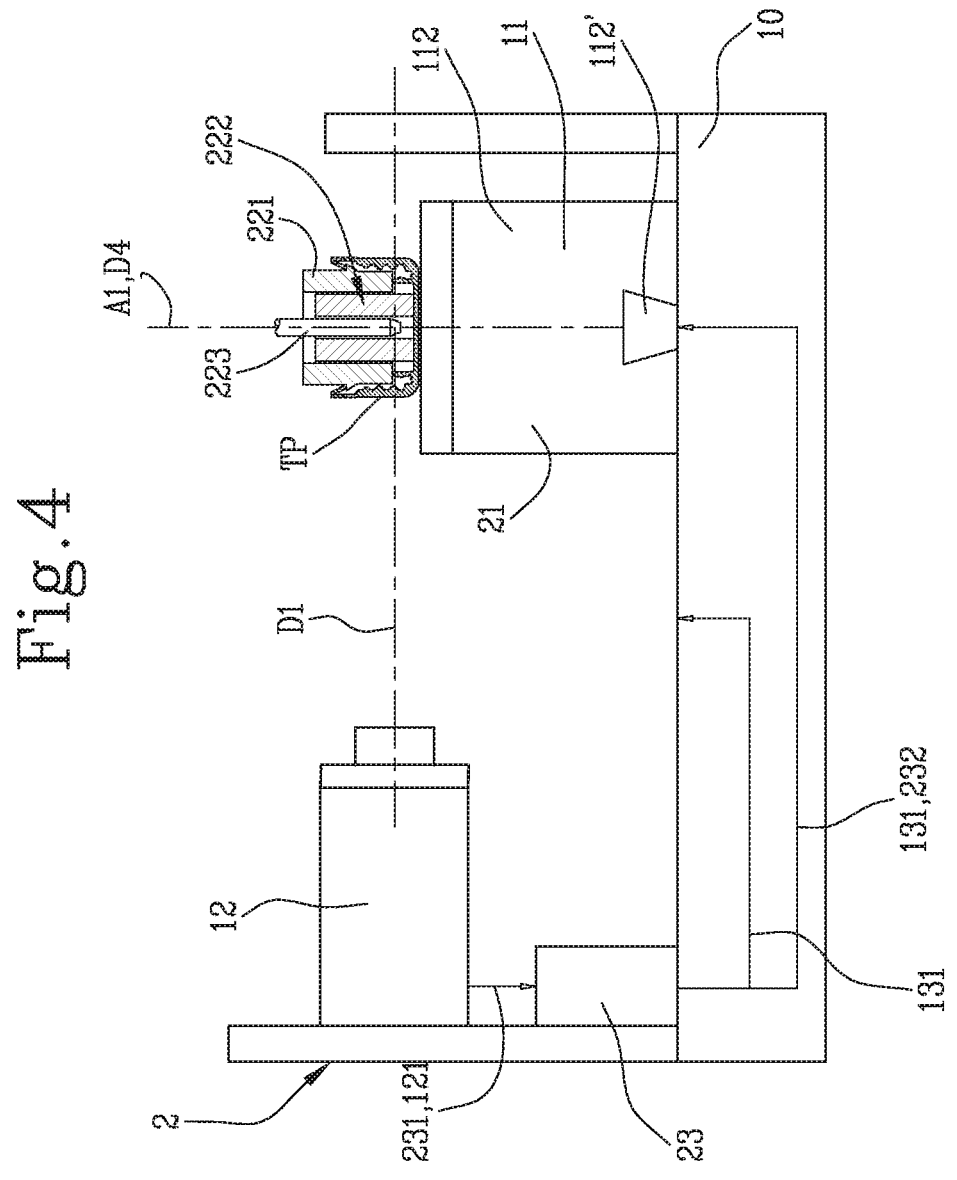
FIG. 4 schematically illustrates a machine for testing a detachment force between a first portion of a cap and a second portion of a cap.
Figures 5A, 5B:
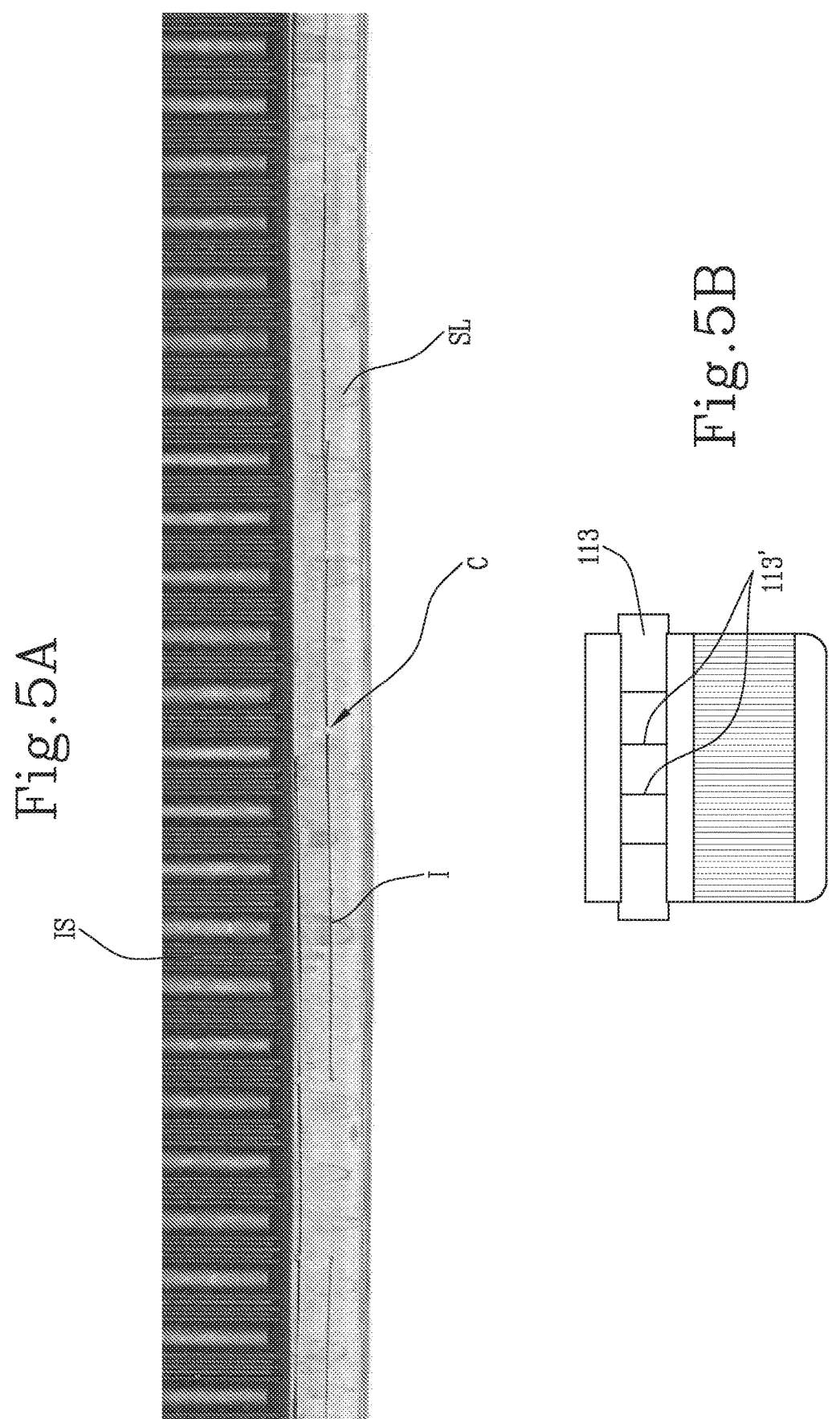
FIGS. 5A and 5B show, respectively, a planar development of the lateral surface of the plastic cap and a side view of a cap positioned on a hold element.

With reference to the accompanying drawings, the numeral 1 denotes a device for inspecting an incision I made on a plastic cap TP, preferably on a lateral surface SL of the plastic cap TP. The incisions are made in the plastic caps TP to separate each plastic cap TP into a first portion P1 and a second portion P2.

The incision I extends intermittently along the lateral surface SL of the plastic cap TP. The incision I defines a first portion P1 of the plastic cap TP and a second portion P2 of the plastic cap TP. Since the incision I is intermittent, the first portion P1 of the plastic cap TP and the second portion P2 of the plastic cap TP are connected by connectors C, defined by uncut zones of the cap TP.

In an embodiment, the connectors C are temporary connectors CT: that is to say, connectors which are broken when the cap is placed on the respective container and the user wishes to pour the contents out of the container.

In an embodiment, the connectors C are permanent connectors CP: that is to say, connectors which, when the cap is placed on the respective container and the user wishes to pour the contents out of the container, allow relative movement between the first portion P1 of the plastic cap TP and the second portion P2 of the plastic cap TP while still allowing the contents to be poured out of the container.

It should be noted that in technical jargon, the frangible (or breakable) connecting means CT are also known by the term "bridges" and the first portion P1 of the cap TP is also known as "tamper evident ring". The permanent connectors CP, on the other hand, are also known by the term "tethers".

It should be noted that the plastic cap TP may also comprise both the frangible connecting means CT and the permanent connectors CP. In effect, the frangible connecting means CT are intended to show that the container is intact and has not been opened yet, while the permanent connectors allow the container to be opened without the risk of losing the plastic cap TP (the second portion P2 of the plastic cap TP). When the permanent connectors CP are provided, the plastic caps are known as tethered caps.

In an embodiment, the device 1 comprises a frame 10. The device 1 comprises an inspection zone ZI in which the plastic cap TP is positioned during inspection.

In an embodiment, the device comprises a conveyor 11, configured to convey the plastic cap TP along an inspection path P1.

In an embodiment, the conveyor 11 is an articulated arm 111 which is hinged to the frame 10 to rotate relative to the frame about a conveying axis. The articulated arm extends between a first end 111A and a second end 111B.

In an embodiment, the conveyor 11 comprises a slide block 112, which is slidable relative to the frame along an orientation parallel to the inspection path P1.

In an embodiment, the conveyor 11 comprises a hold element 113 configured to hold the plastic cap TP in place (that is, supportably receive it) while it is being conveyed along the inspection path P1.

In an embodiment, the hold element 113 is configured to apply a negative pressure on the plastic cap TP so as to hold the plastic cap TP down by suction while keeping the lateral surface SL uncovered.

In the embodiment with the articulated arm 111, the hold element 113 is disposed on the second end 111B of the articulated arm 111. Thus, one rotation of the articulated arm 111 corresponds to a movement of the plastic cap TP along the inspection path PI, which is defined by a circular arc, calculated as the product of the radial extension of the articulated arm 111 (radius) multiplied by an angle of rotation of the articulated arm 111.

Figure 6A:
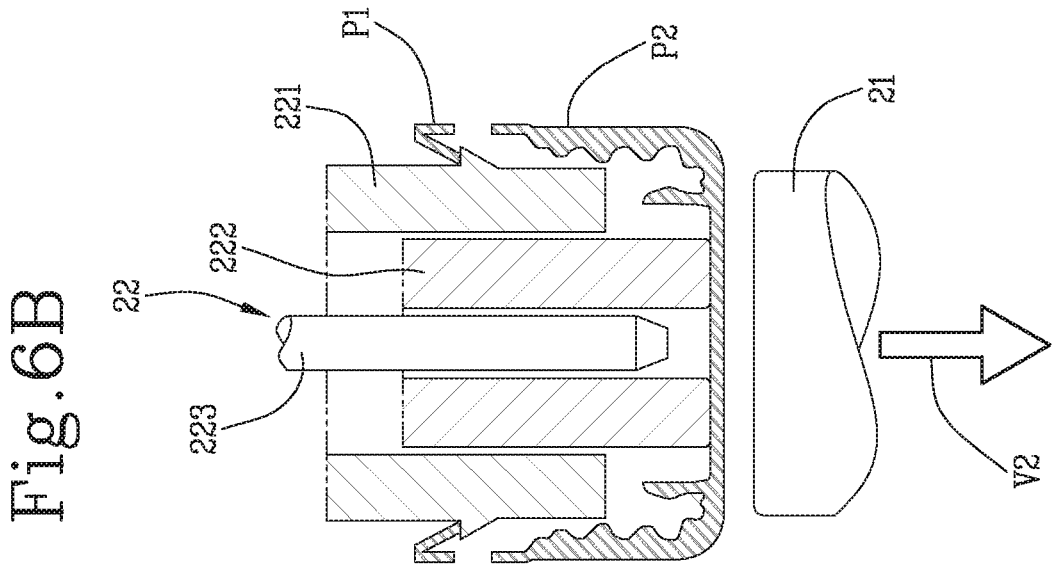
FIGS. 6A, 6B, 6C illustrate successive steps of a method for testing a detachment force between a first portion of a cap and a second portion of a cap.
Figure 6B:
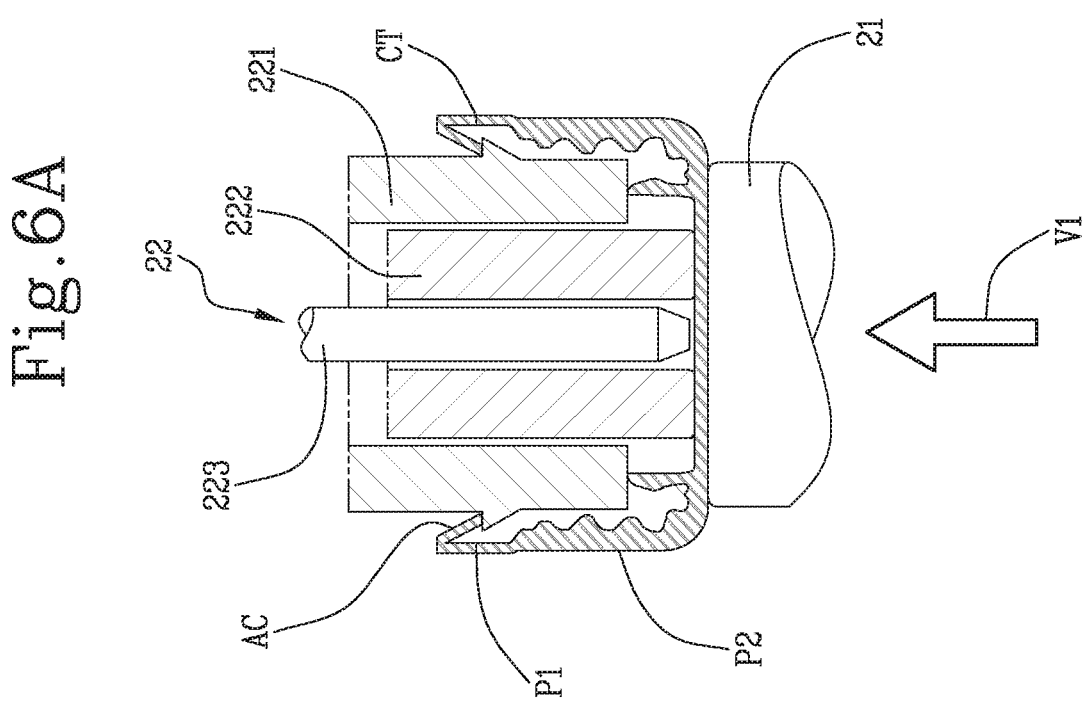
Figure 6C:
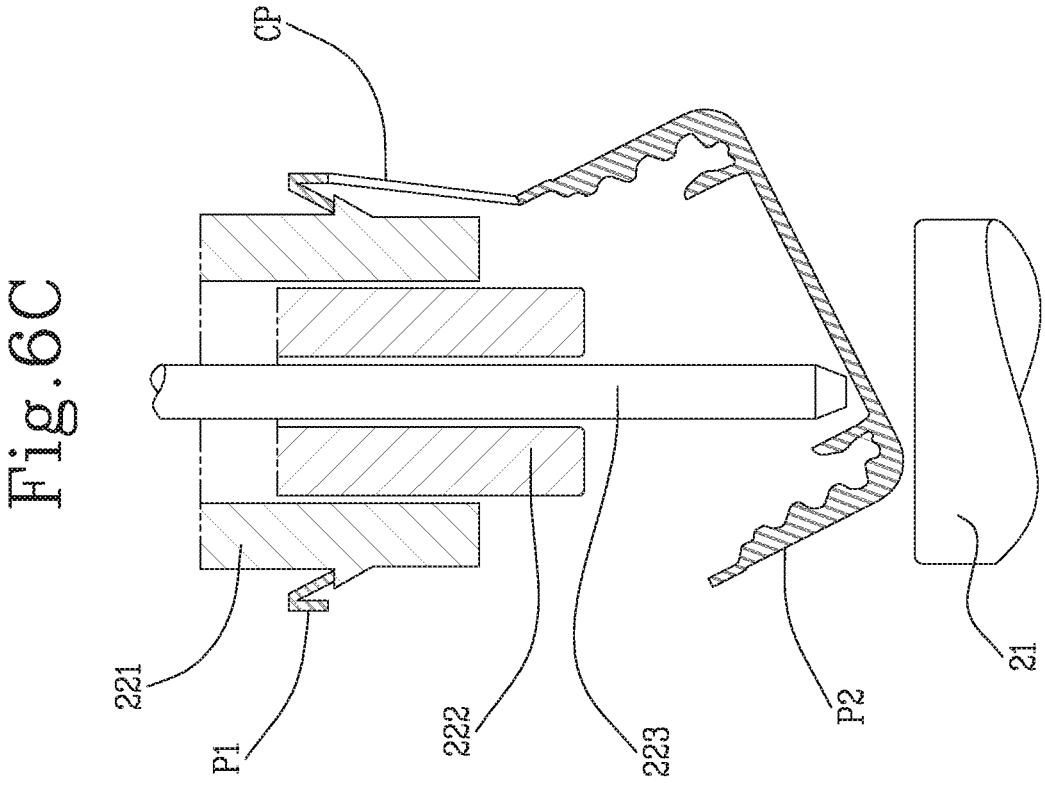
Figure 7B:
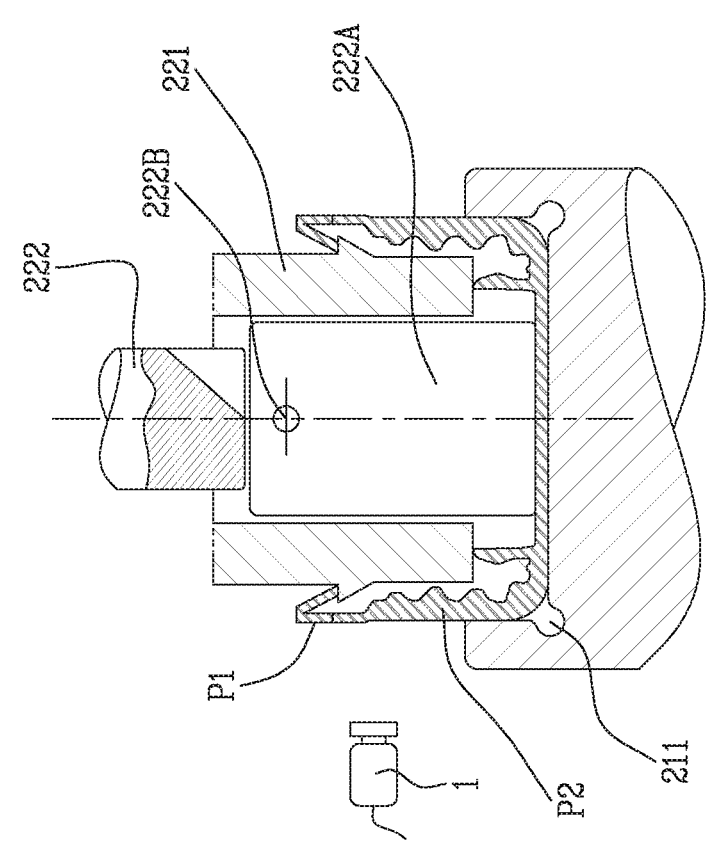
FIGS. 7A, 7B, 7C and 7D illustrate successive steps of an embodiment of the method illustrated in FIGS. 6A, 6B and 6C.
Figure 7A:
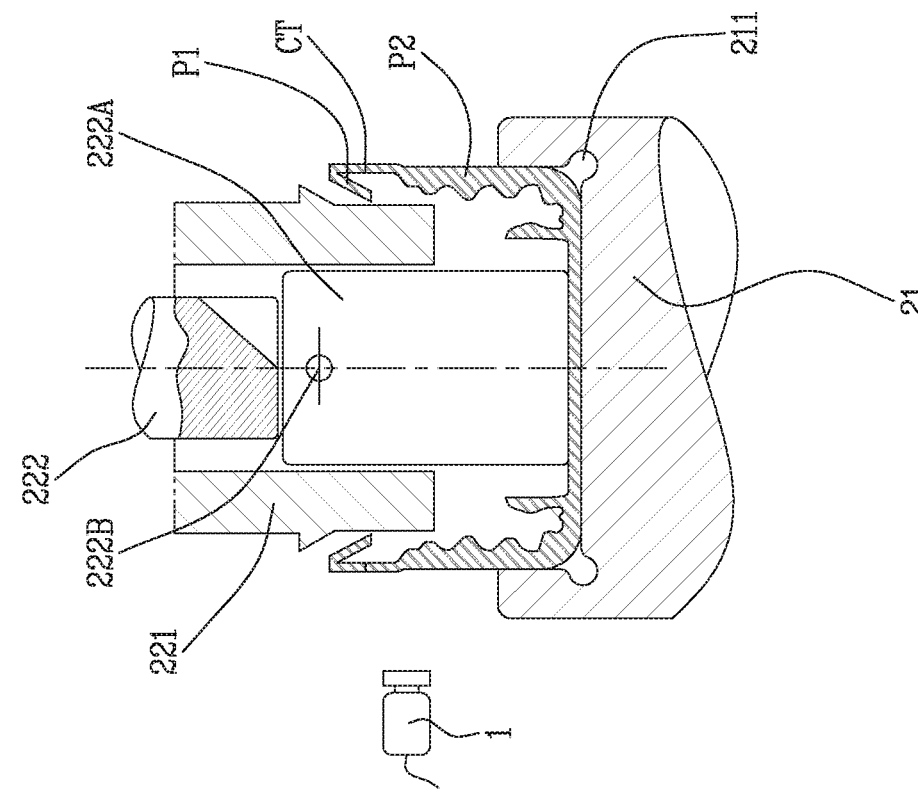
Figure 7D:
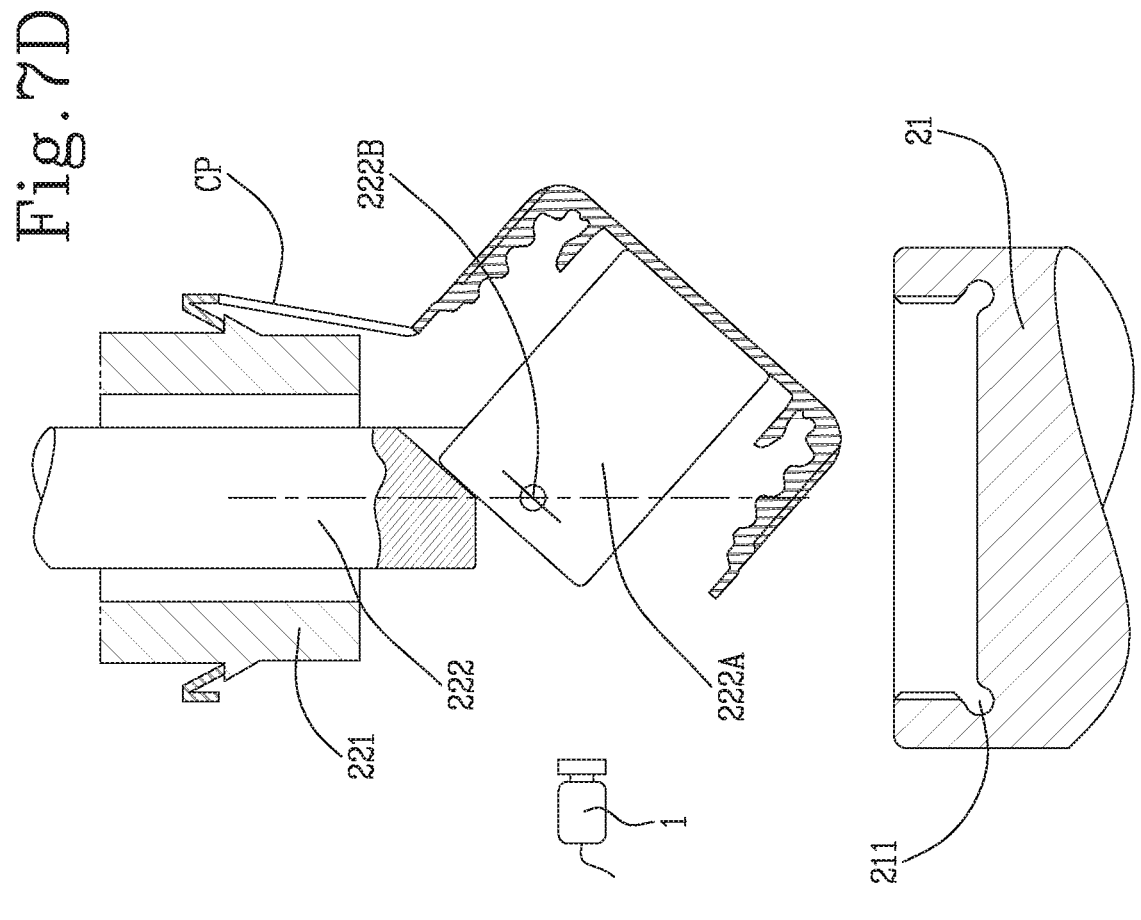
Figure 7C:
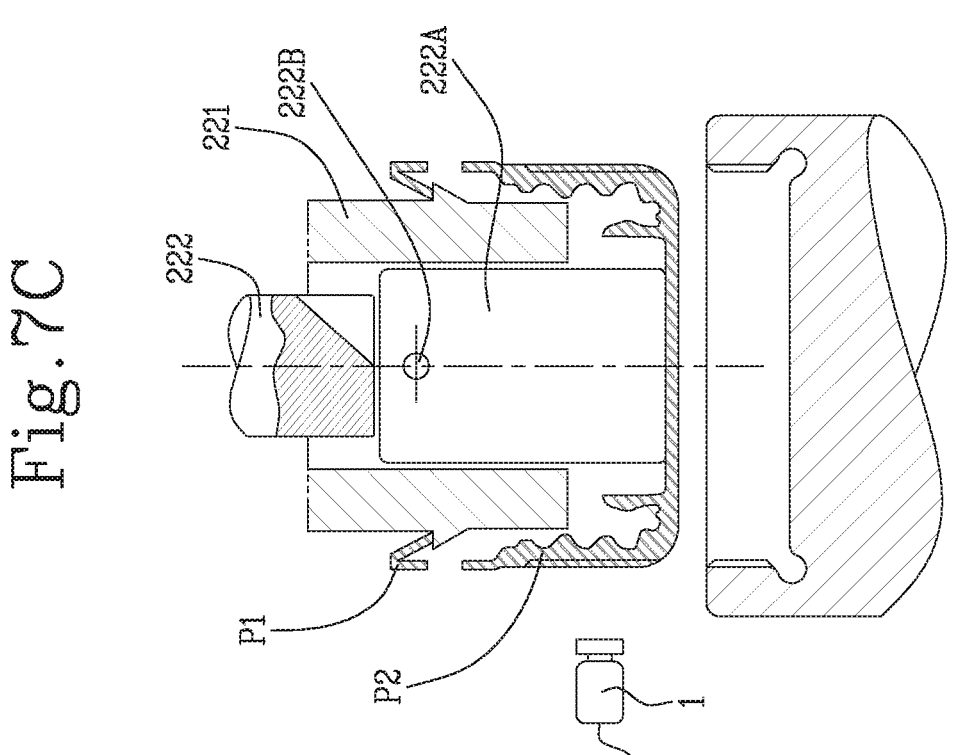

It should be noted that in an example embodiment, the cap TP might be disposed on the abutment element 21 with the opening facing down (alternatively to the embodiment illustrated in FIG. 6B, where the cap is positioned on the abutment element 21 with the opening facing up). For example, extending from the top of the abutment element 21 there may be a gripping element configured to expand so as to grip the cap TP by applying pressure on the inside surface of the cap TP.

In an example embodiment, the plurality of reference elements 113' (that is, the hold element 113) might be positioned on the abutment element 21: that is, applied to it. In other words, the plurality of reference elements 113' (that is, the hold element 113) might be integrated in the abutment element 21. In an example embodiment, the plurality of reference elements 113 may be operatively under (at a level below) the cap.

In the embodiment with the slide block 112, the hold element 113 is disposed above the slide block 112 and supports (that is, holds) the plastic cap TP with or without suction. The slide block 112 is slidably coupled to the frame 10 by a prismatic pair 112' which allows the slide block 112 to slide along the inspecting orientation.

In an embodiment, the hold element 113 rotates about a positioning axis A1. The positioning axis A1 coincides with an axis of symmetry of the plastic cap TP. That way—that is to say, by rotating the hold element 113—it is possible to inspect different portions of the lateral surface of the plastic cap TP. In an embodiment, the hold element 113 is driven by a rotation actuator to rotate the plastic cap TP about the positioning axis A1.

In an embodiment, the device 1 comprises an optical sensor 12. The optical sensor 12 is configured to capture image data 121 representing at least one image of the lateral surface SL of the plastic cap TP.

In an embodiment, the optical sensor 12 is pointed along an imaging orientation. The optical sensor 12 is, for example, a camera, pointed along the imaging orientation D1.

The device 1 comprises a control unit 13.

The optical sensor 12 is configured to send the image data 121 to the control unit 13. Also, the control unit 13 is configured to send command signals 131 to the optical sensor to provide it with instructions as to capturing the image data 121.

In an embodiment, the optical sensor 12 is configured to capture a plurality of images, each associated with a respective portion of the lateral surface SL of the cap TP. In other words, the image data 121 represent the plurality of images.

In an embodiment, the control unit 13 is configured to send the command signals 131 to the rotation actuator to instruct it to rotate the hold element 113.

In a preferred embodiment, the control unit 13 is configured to synchronize the command signals 131 sent to the optical sensor to instruct it to capture an image with the command signals 131 sent to the drive actuator to instruct it to rotate the hold element 113. More specifically, the control unit 13 is configured to send a succession of command signals 131 to the optical sensor 12 and to the drive actuator. Responsive to this succession of command signals 131, the optical sensor 12 captures an image of a first portion of the lateral surface SL of the cap, the rotation actuator rotates the hold element 113 in such a way as to expose a second portion of the lateral surface SL of the cap and the optical sensor 12 captures an image of the second portion.

The control unit 13 is configured to receive the image data 121 representing the plurality of images. The control unit 13 is configured to process the images to produce a developed image IS. The developed image IS is an image made up of the plurality of images captured by the optical sensor 12 and represents in a plane the lateral surface SL of the cap TP.

In an embodiment, the hold element 113 comprises a plurality of references 113' located at respective reference positions along the lateral surface SL of the cap TP. Besides the lateral surface SL of the cap TP, the optical sensor 12 is also configured to image the plurality of references. Thus, each image captured by the optical sensor comprises a portion of the lateral surface SL and one or more references of the plurality 113'. This allows the control unit 13 to make up a developed image IS based on the references 113' in such a way as to identify a joining point where two images of two successive portions of the lateral surface can be joined (attached) to each other.

In an embodiment, the control unit is configured to filter the image data 121 to eliminate the data that might create noise that would negatively affect inspection of the incision.

In an embodiment, the device 1 comprises an illuminator 14. The illuminator 14 is configured to illuminate the plastic cap TP—that is, the lateral surface SL of the plastic cap TP—preferably frontally.

In an embodiment, the illuminator 14 is configured to emit a beam of light. The beam of light is preferably collimated. The beam of light is preferably polarized light.

In an embodiment, the illuminator 14 is configured to emit the beam of light along an emission orientation D3. The emission orientation D3 is inclined to the imaging orientation D1. In an embodiment, the emission orientation D3 is perpendicular to the light orientation. In an embodiment, the illuminator 14 is configured to illuminate the cap along a light orientation D2, which is preferably parallel to—that is, coincident with—the imaging orientation D1.

In an embodiment, the emission orientation D3 coincides with the light orientation D2. In an embodiment, the emission orientation D3 is inclined, preferably perpendicular, to the light orientation D2.

In the embodiment in which the emission orientation D3 is inclined to the light orientation D2, the device 1 comprises a reflective element 15 configured to deflect the beam of light emitted by the illuminator 14.

The reflective element 15 is configured to deflect the beam of light from the emission orientation to the light orientation.

In an embodiment, the reflective element 15 is mounted, along the imaging orientation D1, at a position intermediate between the optical sensor 12 and the inspection zone ZI.

In an embodiment, the device 1 comprises a screening wall 16. The screening wall 16 is mounted, along the imaging orientation D1, at a position intermediate between the optical sensor 12 and the inspection zone ZI. The screening wall 16 is mounted, along the imaging orientation D1, at a position intermediate between the illuminator 14 and the inspection zone ZI. The screening wall 16 is mounted, along the imaging orientation D1, at a position intermediate between the reflective element 15 and the inspection zone ZI.

The screening wall 16 comprises an inspection port 161. The inspection port 161 is aligned with the optical sensor 12 along the imaging orientation D1, which means the optical sensor is configured to inspect the cap TP when the cap is aligned with the inspection port 161 along the imaging orientation D1.

The beam of light passes through the inspection port 161 to illuminate the cap TP in the inspection zone ZI. The inspection port 161 allows focussing the beam on a specific point; it also allows giving shape to the beam of light being emitted.

According to an aspect of it, this disclosure provides a machine 2 for testing a detachment force between a first portion P1 of the cap TP and a second portion P2 of the cap TP. More specifically, with reference to the foregoing description, the machine 2 is configured to check a detachment force of the frangible connecting means CT and/or of the permanent connectors CP.

In an embodiment, the machine 2 comprises an abutment element 21. The abutment element 21 is configured at least to support the cap TP during at least one step of the detachment force test.

In an embodiment, the abutment element 21 is movable, preferably slidable, along a test orientation D4. In an embodiment, the abutment element 21 comprises a cavity 211, configured to house the second portion P2 of the cap. The abutment element 21 is, for example, a piston which is movable along the test orientation D4.

In an embodiment, the machine 2 comprises an actuator 22. The actuator 22 is movable towards and/or away from the abutment element 21 along a test orientation D4.

In an embodiment, the actuator 22 is configured to apply a force between the first portion P1 and the second portion P2 of the cap TP along the test orientation. In other words, the actuator 22 is configured to move the first portion P1 away from the second portion P2, in practice by applying a pulling force on the frangible connecting means CT and then on the permanent connectors CP. In an embodiment, the actuator 22 is configured to move the first portion P1 away from the second portion P2 until breaking the permanent connectors CP and/or the frangible connecting means CT.

In an embodiment, the machine 2 comprises a controller 23 configured to control the pulling force corresponding to the breaking of the permanent connectors CP and/or of the frangible connecting means CT. That way, by assessing the pulling force on different samples, the controller 23 is configured to determine a quality of a batch of caps TP.

In an embodiment, the machine 2 comprises an inspecting device 1 according to one or more of the aspects described in this disclosure.

In an embodiment, the inspecting device 1, responsive to the image data 121, is configured to generate positioning data 231 representing a deviation between a feed position, at which the cap is fed to the machine, and a predetermined test position. In other terms, in the case where the cap TP is provided with frangible connecting means CT and permanent connectors CP, the machine 2 may involve applying the detachment force with the cap disposed at a specific test position. To speed up the inspection process, however, the caps TP are fed in random fashion, without a predetermined feed position. The non-uniformity of the positions, especially in the presence of permanent connectors CP, might therefore negatively affect the repeatability of the tests.

The device 1 for inspecting the incisions is therefore capable, by processing the developed image IS, of determining a deviation between the feed position and the predetermined test position.

The controller 23 is connected to the abutment element 21 to control its movement. More specifically, the abutment element 21 rotates about a positioning axis A1 to vary an angular position of the cap relative to the actuator 22.

In an embodiment, the machine 2 comprises a positioning actuator, configured to rotate the abutment element 21, hence the cap TP.

In an embodiment, the controller 23 is configured to receive the positioning data 231 from the device 1. The controller 23 is configured to generate rotation data 232, based on the positioning data 231, to instruct the positioning actuator to rotate the abutment element 21, hence the cap TP, from the feed position to the predetermined test position.

The actuator 22 may be made according to at least a first and a second embodiment.

According to a first embodiment, the actuator 22 comprises a gripping element 221 a first pushing element 222 and a second pushing element 223.

The gripping element 221 the first pushing element 222 and the second pushing element 223 are slidable relative to each other along the test orientation D4.

It should be borne in mind that the first portion P1 of the cap TP includes retaining means which may be configured as a circumferential skirt AC that extends along the circumference of the cap TP and protrudes towards the centre of the cap TP.

The skirt may be continuous or discontinuous.

In an embodiment, the retaining means comprise a "hooked" retaining means.

In an embodiment, the circumferential extension of the retaining means may extend along a part of the circumference. In an embodiment, the circumferential extension of the retaining means may extend along the entire circumference.

According to the first embodiment of the actuator 22, the gripping element 221 engages the retaining means thanks to the movement in the hooking direction V1 (in practice, moving the abutment element 21 upwards forces the retaining means to hook onto an undercut of the gripping element 221).

In an embodiment, the first pushing element 222 is concentric with the gripping element 221 and is disposed internally thereof. In an embodiment, the second pushing element 223 is concentric with the first pushing element 223 and is disposed internally thereof.

In an embodiment, the first pushing element 222 is configured to slide relative to the gripping element 221 until coming into contact with a bottom surface of the second portion P2. The first pushing element 222 and the abutment element 21 are configured to move together translationally along the test orientation D4 away from the gripping element 221. This movement generates a pulling force on the frangible connecting means CT which subsequently causes them to break.

In an embodiment, the second pushing element 223 is configured to slide relative to the gripping element 221 and relative to the first pushing element 222 until coming into contact with a bottom surface of the second portion P2. The second pushing element 223 and the abutment element 21 are configured to move translationally along the test orientation D4 away from the gripping element 221 and from the first pushing element 222. This movement generates a pulling force on the permanent connectors CP which subsequently causes them to break.

According to a second embodiment, the actuator 22 comprises only the first pushing element 222 in addition to the gripping element. In this embodiment, the first pushing element 222 comprises a rotary pusher 222A which rotates about a hinge 222B.

The first pushing element 222 is configured to slide relative to the gripping element 221 until breaking the "bridges"—that is, the frangible connecting means CT. The first pushing element 222 is configured to slide relative to the gripping element 221 and then to allow the rotary pusher 222A to rotate to check the breaking strength of the "tethers"—that is, of the permanent connectors CP.

It may be noted that the possibility of placing the cap TP at a predetermined position relative to the feed position is particularly (but not exclusively) advantageous in the embodiment that includes the rotary pusher 222A.

According to an aspect of it, this disclosure provides a method for inspecting an incision I made on plastic cap TP, preferably on a lateral surface SL of the plastic cap TP. In an embodiment, the method is a method for inspecting an incision made on a "tethered" cap: that is to say, on a cap which, during use of the container the cap is placed on, remains connected to a security ring, usually joined to the neck of the container.

The method comprises a step of providing a device 1 for inspecting the incision and comprising a frame 10. The method comprises a step of positioning the cap TP in an inspection zone ZI where inspection is performed.

The method comprises a step of conveying in which a conveyor 11 of the device 1 transports the plastic cap TP along an inspection path PI.

In an embodiment, in which the conveyor 11 comprises an articulated arm 111, the articulated arm 111 rotates about a conveying axis relative to the frame. In an embodiment, in which the conveyor 11 comprises a slide block 112, the slide block 112 runs along an orientation parallel to the inspection path PI relative to the frame.

The method comprises a step of holding, in which a hold element 113 of the device 1 holds the plastic cap TP in place (that is, supportably receives it) while it is being conveyed along the inspection path P1.

In the step of holding, the hold element 113 applies a negative pressure on the plastic cap TP so as to hold the plastic cap TP down by suction while keeping the lateral surface SL uncovered.

In an embodiment, the hold element 113 is disposed on a second end 111B of the articulated arm 111, distal from the frame 10. Thus, when the arm rotates about the conveying axis, the hold element describes a circular arc that defines the inspection path.

In the step of conveying through the slide block 112, the hold element 113 is disposed above the slide block 112 and supports (that is, holds) the plastic cap TP with or without suction. The slide block 112 runs on the frame 10 by means of a prismatic pair 112'.

In an embodiment, the hold element 113 rotates about a positioning axis A1. The positioning axis A1 coincides with an axis of symmetry of the plastic cap TP. In an embodiment, the hold element 113 is driven (rotated) by a rotation actuator to rotate the plastic cap TP about the positioning axis A1.

In an embodiment, the method comprises a step of imaging.

In the step of imaging, an optical sensor 12 captures image data 121 representing at least one image of the lateral surface SL of the plastic cap TP.

In the step of imaging, the optical sensor 12 is oriented along an imaging orientation. The optical sensor 12 is, for example, a camera, pointed along the imaging orientation D1.

The method comprises a step of controlling by means of a control unit 13. The optical sensor 12 sends the image data 121 to the control unit 13. Also, the control unit 13 sends command signals 131 to the optical sensor to provide it with instructions as to capturing the image data 121.

In an embodiment, the optical sensor 12 captures a plurality of images, each associated with a respective portion of the lateral surface SL of the cap TP. In other words, the image data 121 represent the plurality of images.

In an embodiment, the control unit 13 sends the command signals 131 to the rotation actuator to instruct it to rotate the hold element 113.

In a preferred embodiment, the control unit 13 synchronizes the command signals 131 sent to the optical sensor to instruct it to capture an image with the command signals 131 sent to the drive actuator to instruct it to rotate the hold element 113.

For example, but not necessarily, the control unit 13 sends a command signal to the optical sensor 12 to capture a first image, then sends a command signal to the drive actuator to rotate the cap TP through a predetermined angle of rotation and then sends another command signal 131 to the optical sensor 12 to instruct it to take another snapshot of a portion of the lateral surface SL different from the portion previously imaged.

The control unit 13 receives the image data 121 representing the plurality of images. The control unit 13 processes the images to produce a developed image IS made up of the plurality of images captured by the optical sensor 12 and representing in a plane the lateral surface SL of the cap TP.

The step of developing the developed image IS comprises a step of processing references 113'. More specifically, in an embodiment in which the hold element 113 comprises a plurality of references 113' located at respective reference positions along the lateral surface SL of the cap TP, the optical sensor 12 images the plurality of references as well as the lateral surface SL of the cap TP. The control unit 13 makes up the developed image IS based on the references 113'. The control unit 13 identifies a joining point where two images of two successive portions of the lateral surface can be joined (attached) to each other, based on the references 113'.

In an embodiment, the control unit filters the image data 121 and eliminates the data that might create noise that would negatively affect inspection of the incision.

In an embodiment, the method comprises a step of lighting. In an embodiment, the method comprises a step of emitting a beam of light, preferably collimated and/or polarized. In the step of lighting, the illuminator 14 illuminates the plastic cap TP—that is, the lateral surface SL of the plastic cap TP13 preferably frontally.

In an embodiment, the illuminator emits a beam of light.

In an embodiment, the illuminator 14 emits the beam of light along an emission orientation D3. In an embodiment, the illuminator 14 illuminates the cap along a light orientation D2, which is preferably parallel to—that is, coincident with—the imaging orientation D1.

In an embodiment, the emission orientation D3 coincides with the light orientation D2. In an embodiment in which the emission orientation D3 is inclined, or perpendicular, to the light orientation D2, the method comprises a step of reflecting whereby a reflective element 15 deflects the beam of light emitted by the illuminator 14.

The reflective element 15 deflects the beam of light from the emission orientation to the light orientation.

In an embodiment, the method comprises a step of screening, in which a screening wall 16 which is mounted, along the imaging orientation D1, at a position intermediate between the optical sensor 12 and the inspection zone ZI, limits the inspection port of the optical sensor. More specifically, the screening wall 16 comprises an inspection port 161 which allows the beam of light to pass through it. The inspection port 161 is aligned with the optical sensor 12 along the imaging orientation D1, which means the optical sensor inspects the cap TP when the cap is aligned with the inspection port 161 along the imaging orientation D1. The beam of light passes through the inspection port 161 to illuminate the cap TP in the inspection zone ZI.

According to an aspect of it, this disclosure provides a method for testing a detachment force between a first portion P1 of the cap TP and a second portion P2 of the cap TP. More specifically, with reference to the foregoing description, the machine 2 checks a detachment force of the frangible connecting means CT and/or of the permanent connectors CP.

In an embodiment, the method comprises a step of abutting, in which an abutment element 21 of the machine 2 receives the cap TP in a cavity 221 and then, once the cap has been engaged by the gripping element, accompanies the cap TP while remaining spaced from the cap TP.

More specifically, in an embodiment, in the step in which the breaking strength of the frangible connecting means CT is measured, the abutment element 21 accompanies the cap TP while remaining at a predetermined distance from it, so as to avoid interference (binging, jamming).

Next, in the step of measuring the breaking strength of the permanent connector CP, the abutment element 21 moves away completely.

In an embodiment, the method comprises a step of moving, preferably a step of sliding, the abutment element 21 along a test orientation D4. In an embodiment, in the step of abutting, the cavity 211 of the abutment element houses the second portion P2 of the cap.

In an embodiment, the method comprises a step of moving an actuator 22 of the machine 2. In the step of moving the actuator, the actuator 22 moves towards and/or away from the abutment element 21 along a test orientation D4.

In an embodiment, the actuator 22 applies a force between the first portion P1 and the second portion P2 of the cap TP along the test orientation. In other words, the actuator 22 moves the first portion P1 away from the second portion P2, in practice by applying a pulling force on the frangible connecting means CT and then on the permanent connectors CP. In an embodiment, the actuator 22 moves the first portion P1 away from the second portion P2 until breaking the frangible connecting means CT and then the permanent connectors CP.

In an embodiment, the method comprises a step of controlling by means of a controller 23 of the machine 2. The controller 23 controls the pulling force corresponding to the breaking of the permanent connectors CP and/or of the frangible connecting means CT. That way, by assessing the pulling force on different samples, the controller 23 determines a quality (by comparing it against optimum quality parameters) of a batch of caps TP.

In an embodiment, the method comprises a step of inspecting. In the step of inspecting, a device 1 according to one or more of the features described in this disclosure, responsive to the image data 121, generates positioning data 231 representing a deviation between a feed position, at which the cap is fed to the machine, and a predetermined test position. In other terms, in the case where the cap TP is provided with frangible connecting means CT and permanent connectors CP, the machine 2 must apply the detachment force with the cap disposed at a specific test position.

It should be noted that positioning at the test position relative to the feed position is not essential but is particularly advantageous when the rotary pusher is provided.

The device 1 for inspecting the incisions determines a deviation between the feed position and the predetermined test position based on the developed image IS.

The controller 23 controls a movement of the abutment element 21. More specifically, the method involves rotating the abutment element 21 about a positioning axis A1 to vary an angular position of the cap relative to the actuator 22.

In an embodiment, the machine 2 comprises a positioning actuator which rotates the abutment element 21, hence the cap TP.

In an embodiment, the controller 23 receives the positioning data 231 from the device 1. The controller 23 generates rotation data 232, based on the positioning data 231, to instruct the positioning actuator to rotate the abutment element 21, hence the cap TP, from the feed position to the predetermined test position.

The method comprises an effective step of testing, in which the actuator 22 moves, if necessary in combination with a movement of the abutment element 21, to assess the extent of the detachment force.

This step of testing may be carried out according to a first embodiment or according to a second embodiment.

According to the first embodiment, the actuator 22 comprises a gripping element 221 a first pushing element 222 and a second pushing element 223. In an embodiment, the first pushing element 222 is concentric with the gripping element 221 and is disposed internally thereof. In an embodiment, the second pushing element 223 is concentric with the first pushing element 223 and is disposed internally thereof.

The step of testing comprises a first step of sliding, between the first pushing element 222 and the gripping element 221. In the first step of sliding, the gripping element is hooked to a retaining means—for example, a circumferential skirt AC of the first portion P1 of the cap TP, extending along the circumference of the cap TP and protruding towards the centre of the cap TP. When hooked in this way, the first portion P1 of the cap TP is unable to move in a pushing direction V2. The first pushing element 222 slides relative to the gripping element until coming into contact with a bottom surface of the second portion P2.

The first pushing element 222 and the abutment element 21 move together (as one) along the test orientation D4 away from the gripping element 221. This movement generates a pulling force on the frangible connecting means CT which subsequently causes them to break.

Once the detachment force needed to break the "bridges"—that is, the frangible connecting means CT—has been tested, it is necessary to test the breaking strength of the permanent connectors CP—that is, the "tethers".

In this regard, the step of testing comprises a second step of sliding. In the second step of sliding, the second pushing element 222 slides relative to the gripping element 221 and relative to the first pushing element 222 until coming into contact with a bottom surface of the second portion P2. The second pushing element 222 and the abutment element 21 slide together along the test orientation D4 away from the gripping element 221 and from the first pushing element 222. More specifically, the abutment element accompanies the cap TP for a certain distance along the test orientation D4. This movement generates a pulling force on the permanent connectors CP which subsequently causes them to break.

The step of testing may also be carried out according to an alternative embodiment.

In this embodiment, the first pushing element 222 comprises a rotary pusher 222A which rotates about a hinge 2228.

In this alternative embodiment, the method comprises a single step of sliding in which the first pushing element 222 slides relative to the gripping element 221 until breaking the "bridges"—that is, the frangible connecting means CT. After that, the same first pushing element 222 continues sliding. Furthermore, while the first pushing element 222 continues sliding, the rotary pusher 222A rotates about the hinge 222B to pull the second portion of the cap P2 and to place the permanent connectors CP under stress. In this embodiment, therefore, the step of testing is accomplished by sliding the first pushing element 222 and rotating the pusher 222A.

The following paragraphs, listed in alphanumeric order for reference, are non-limiting example modes of describing this invention.

A00. A machine for testing a detachment force between a first portion of a cap and a second portion of a cap, connected to the first portion of the cap by one or more connections, the machine comprising:

a gripping element, configured to hold the second portion of the cap;

a pushing element, movable relative to the gripping element along a test orientation and configured to apply a force between the first and the second portion of the cap to move them apart along the test orientation, in a test direction;

a control unit, configured to receive the image data from the inspecting device and to capture positioning data based on the image data; the positioning data representing a position of the cap relative to the actuator.

A00. The machine according to paragraph A00, comprising an inspecting device, configured to capture image data, representing an image of a lateral surface SL of the cap TP.

A01. The machine according to paragraph A000, wherein the positioning data represent a deviation between a feed position, adopted by the cap when it is fed to the machine, and a predetermined test position.

A02. The machine according to paragraph A00 or A01, comprising a positioning actuator, configured to rotate the cap from the feed position to the predetermined test position, based on the positioning data.

A03. The machine according to any one of paragraphs from A00 to A02, wherein the inspecting device is a device for inspecting an incision made on a lateral surface of a plastic cap, the device comprising:

an inspection zone in which the cap to be inspected and/or tested can be positioned;

a conveyor, configured to convey the cap along an inspection path passing through the inspection zone;

an illuminator, configured to emit a light along a light orientation towards the inspection zone to illuminate the lateral surface of the cap;

an optical sensor, configured to capture image data representing at least one image of the lateral surface of the cap;

a control unit, configured to receive the image data and to process the image data to derive information about the incision from the image data.

A04. The machine according to paragraph A03, wherein the light emitted by the illuminator is polarized and/or collimated.

A05. The machine according to paragraph A03 or A04, wherein the image data represent a plurality of images of the lateral surface of the cap, corresponding to respective portions of the lateral surface of the cap, spaced from each other along the lateral surface.

A06. The machine according to paragraph A05, wherein the control unit is configured to process the image data to derive a developed image representing the lateral surface of the cap in a plane.

A07. The machine according to any one of paragraphs from A00 to A06, wherein the abutment element comprises a suction unit, configured to apply a negative pressure to hold the cap in place as it is transported along the inspection path.

A08. The machine according to any one of paragraphs from A00 to A07, wherein the abutment element rotates about an axis of rotation which is perpendicular to the inspection path to rotate the cap about its axis of symmetry.

A09. The machine according to any one of paragraphs from A00 to A08, wherein the hold element comprises a plurality of notches, preferably spaced from each other along an outer circumference of the hold element.

A10. The machine according to any one of paragraphs from A00 to A09, wherein the inspecting device comprises an additional optical sensor to form a plurality of optical sensors, disposed at respective capture positions, spaced from each other, to capture corresponding subsets of the image data, each representing one or more images of a corresponding portion of the lateral surface of the cap.

A11. The machine according to any one of paragraphs from A00 to A10, wherein the device comprises a reflective element and wherein the illuminator is configured to emit the polarized light along an emission orientation which is inclined to the light orientation, and wherein the reflective element is configured to deflect the collimated polarized light from the emission orientation to the light orientation.

B00. A method for testing a detachment force between a first portion of a cap and a second portion of a cap, connected to the first portion of the cap by one or more connections, the method comprising the following steps:

gripping the second portion of the cap by means of a gripping element;

moving a pushing element relative to the gripping element along a test orientation;

applying a force between the first and the second portion of the cap to move them apart along the test orientation, in a test direction;

capturing image data, representing an image of a lateral surface SL of the cap TP to inspect the lateral surface of the cap;

receiving the image data in a control unit;

generating positioning data representing a position of the cap relative to the actuator, based on the image data.

B01. The method according to paragraph BOO, comprising a step of positional adjustment, wherein a positioning actuator of the machine rotates the cap from the feed position to the predetermined test position, based on the positioning data.

The invention claimed is:

1. A method for inspecting an incision made on a lateral surface of a plastic cap, the method comprising the following steps:

conveying the plastic cap on a conveyor along an inspection path through an inspection zone in which the cap is inspected;

emitting a light along an emission orientation, the light being collimated along a light orientation towards the inspection zone, through an illuminator, the illuminator including a light source for emitting a beam of light, to illuminate the lateral surface of the cap;

rotating the cap about an axis of rotation, so that the cap rotates about its axis of symmetry;

capturing image data representing at least one image of the lateral surface of the cap through an optical sensor;

deflecting the beam light from the emission orientation to the light orientation by a reflective element interposed between the cap and the optical sensor, along a detection direction of the optical sensor, wherein the reflective element allows illumination of the lateral surface and acquisition of the lateral surface from the same side, so to capture the lateral surface of the cap in reflection, processing the image data to derive information about the incision based on the image data, wherein the step of rotating exposes different portions of the lateral surface of the cap to the optical sensor, to allow the optical sensor to capture an image of each portion of the lateral surface of the cap.

2. The method according to claim 1, wherein the image data represent a plurality of images of the lateral surface of the cap, corresponding to respective portions of the lateral surface of the cap, spaced from each other along the lateral surface.

3. The method according to claim 2, wherein the step of processing the image data produces a developed image depicting the lateral surface of the cap represented in a plane.

4. The method according to claim 1, comprising a step of holding by suction, in which the cap being conveyed along the inspection path is held down on the conveyor by suction.

5. The method according to claim 1, comprising a step of rotating, in which the cap is rotated about an axis of rotation which is perpendicular to the inspection path, so the cap rotates about its axis of symmetry.

6. The method according to claim 1, wherein the plastic cap comprises a first portion and a second portion, connected to the first portion by frangible connecting means removable to open the cap and/or by a permanent connector which allows relative movement between the first portion and the second portion of the cap.

7. The method according to claim 1, comprising an additional step of imaging to form a plurality of steps of imaging, each intended to capture a corresponding subset of image data, each representing images of a corresponding portion of the lateral surface of the cap.

8. The method according to claim 1, wherein the emitted light is polarized.

9. The method according to claim 1, wherein the illuminator is located outside the cap and the optical sensor detects light rays reflected by the illuminated the lateral surface of the cap.

10. A device for inspecting an incision made on a lateral surface of a plastic cap, the device comprising:

an inspection zone in which the cap to be inspected can be positioned;

a conveyor, configured to convey the cap along an inspection path passing through the inspection zone;

an illuminator, including a light source configured to emit a beam of light along an emission orientation, the light being collimated along a light orientation towards the inspection zone, to illuminate the lateral surface of the cap;

an optical sensor configured to capture image data representing at least one image of the lateral surface of the cap;

a reflective element, interposed between the cap and the optical sensor along a detection direction of the optical sensor and configured for deflecting the beam light from the emission orientation to the light orientation, so to allow illumination of the lateral surface and acquisition of the lateral surface from the same side, so to capture the lateral surface of the cap in reflection;

a control unit, configured to receive the image data and to process the image data to derive information about the incision from the image data, wherein the cap is configured for rotating about an axis of rotation, so that the cap rotates about its axis of symmetry, in order to expose different portions of the lateral surface of the cap to the optical sensor to allow the optical sensor to capture an image of each portion of the lateral surface of the cap.

11. The device according to claim 10, wherein the image data represent a plurality of images of the lateral surface of the cap, corresponding to respective portions of the lateral surface of the cap, spaced from each other along the lateral surface.

12. The device according to claim 11, wherein the control unit is configured to process the image data to derive a developed image representing the lateral surface of the cap in a plane.

13. The device according to claim 10, wherein the conveyor comprises a hold element, configured to keep the cap in an inspection position as it moves along the inspection path.

14. The device according to claim 13, wherein the hold element comprises a suction unit, configured to apply a negative pressure to hold the cap in place as it is transported along the inspection path.

15. The device according to claim 13, wherein the hold element rotates about an axis of rotation which is perpendicular to the inspection path to rotate the cap about its axis of symmetry.

16. The device according to claim 13, wherein the hold element comprises a plurality of references, spaced from each other along an outer circumference of the hold element.

17. The device according to claim 10, comprising an additional optical sensor to form a plurality of optical sensors, disposed at respective imaging positions, spaced from each other, to capture corresponding subsets of the image data, each representing images of a corresponding portion of the lateral surface of the cap.

18. The device according to claim 10, wherein the inspection path defines a circular arc.

19. The device according to claim 10, wherein the control unit is configured to filter the image data to keep only the image data representing a predetermined portion of the image of the lateral surface.

20. The device according to claim 10, wherein the illuminator is configured to emit the collimated light along the emission orientation inclined to the light orientation.

21. The device according to claim 10, wherein the collimated light is polarized.

22. A machine for testing a detachment force between a first portion of a cap and a second portion of a cap, connected to the first portion of the cap by one or more connectors, the machine comprising:

a gripping element configured to hold the second portion of the cap;

a pushing element, movable relative to the gripping element along a test orientation and configured to apply a force between the first portion and the second portion of the cap to move them along the test orientation in a pushing direction;

an inspecting device, wherein the inspecting device comprises:

an inspection zone in which the cap to be inspected can be positioned;

a conveyor, configured to convey the cap along an inspection path passing through the inspection zone;

an illuminator, configured to emit a light collimated along a light orientation towards the inspection zone, to illuminate the lateral surface of the cap;

an optical sensor configured to capture image data representing at least one image of the lateral surface of the cap;

a control unit, configured to receive the image data and to process the image data to derive information about the incision from the image data.

23. The machine according to claim 22, wherein the inspecting device is configured to generate, responsive to the image data, positioning data representing a deviation between a feed position, at which the cap is fed to the machine, and a predetermined test position, and wherein the machine comprises a positioning actuator, configured to rotate the cap from the feed position to the predetermined test position, based on the positioning data.

\* \* \* \* \*